(12) United States Patent
Bridgeford et al.

(10) Patent No.: US 7,469,709 B2
(45) Date of Patent: Dec. 30, 2008

(54) THREE-WEDGE DOUBLE BLOCK ISOLATION CHAMBER

(75) Inventors: Stanley James Bridgeford, Tulsa, OK (US); Kenneth E. Embry, Tomball, TX (US)

(73) Assignee: Kesta, L.L.C., Tulsa, OK (US)

( * ) Notice: Subject to any disclaimer, the term of this patent is extended or adjusted under 35 U.S.C. 154(b) by 38 days.

(21) Appl. No.: 11/098,216

(22) Filed: Apr. 4, 2005

(65) Prior Publication Data

US 2005/0224741 A1 Oct. 13, 2005

Related U.S. Application Data

(60) Provisional application No. 60/559,177, filed on Apr. 2, 2004.

(51) Int. Cl.
F15B 13/00 (2006.01)
F16L 55/10 (2006.01)

(52) U.S. Cl. .......................... 137/271; 137/269; 138/40; 138/94; 138/94.3

(58) Field of Classification Search ................ 251/203, 251/326–329; 138/94, 94.3, 40; 137/269, 137/271
See application file for complete search history.

(56) References Cited

U.S. PATENT DOCUMENTS

| | | | | |
|---|---|---|---|---|
| 1,357,974 A | | 11/1920 | Gorman | |
| 2,309,304 A | | 1/1943 | Creighton | |
| 2,743,742 A | * | 5/1956 | Muff | 138/44 |
| 2,861,559 A | * | 11/1958 | Reiners | 123/375 |
| 3,165,124 A | * | 1/1965 | Ausburn et al. | 138/94.3 |
| 3,189,319 A | * | 6/1965 | Bredtschneider | 251/328 |
| 3,342,217 A | * | 9/1967 | Low | 138/94.3 |
| 3,598,154 A | | 8/1971 | Brundage | |
| 3,689,028 A | * | 9/1972 | Dickenson et al. | 251/328 |
| 3,743,244 A | | 7/1973 | Dickenson et al. | |
| 3,837,617 A | * | 9/1974 | Eminger et al. | 251/87 |

(Continued)

*Primary Examiner*—John Rivell
*Assistant Examiner*—Andrew J Rost
(74) *Attorney, Agent, or Firm*—Fellers, Snider, Blankenship, Bailey & Tippens, P.C.; Scott R. Zingerman

(57) ABSTRACT

A three-wedge double block isolation chamber including a body with an internal chamber bounded by an inlet and an outlet having a wedge assembly positioned in the chamber. The wedge assembly may be configured as either a blind wedge assembly to block the flow of liquid through a pipeline; a flow-through wedge assembly to permit flow of liquid through a pipeline; or a meter wedge assembly to meter the flow of liquid through the pipeline. The wedge assembly includes an upstream wedge, a downstream wedge, and a force wedge. The wedge assembly seats in the internal chamber of the body. The upstream wedge and the downstream wedge each include a seal and are positioned respectively against the inlet and outlet. The upstream wedge and the downstream wedge each also include a tapered surface to mate the tapered surface of a force wedge such that when the force wedge is inserted between the upstream wedge and the downstream wedge, a force is applied so as to seal the upstream wedge against the inlet and the downstream wedge against the outlet, thereby producing to independent seals, one on each end of the internal chamber of the body. When the blind wedge assembly is positioned in the chamber, it provides a double block and seal to assist in the prevention of flow of a liquid through a pipeline past the isolation chamber.

21 Claims, 11 Drawing Sheets

U.S. PATENT DOCUMENTS

| | | |
|---|---|---|
| 3,895,777 A | 7/1975 | Althaus |
| 3,993,285 A * | 11/1976 | Conley ................. 251/86 |
| 4,343,332 A * | 8/1982 | Williams et al. ........... 138/94.3 |
| 4,408,636 A | 10/1983 | Karpenko |
| 4,449,547 A * | 5/1984 | Krakovsky ................. 137/330 |
| 4,503,594 A | 3/1985 | Gall et al. |
| 5,232,199 A | 8/1993 | Thrasher |
| 5,454,547 A * | 10/1995 | Brown ................. 251/214 |
| 5,941,506 A * | 8/1999 | Smith et al. ............. 251/335.3 |
| 6,338,469 B1 * | 1/2002 | Kalsi et al. ................. 251/326 |
| 6,401,747 B1 * | 6/2002 | Cain et al. ............. 137/329.03 |

\* cited by examiner

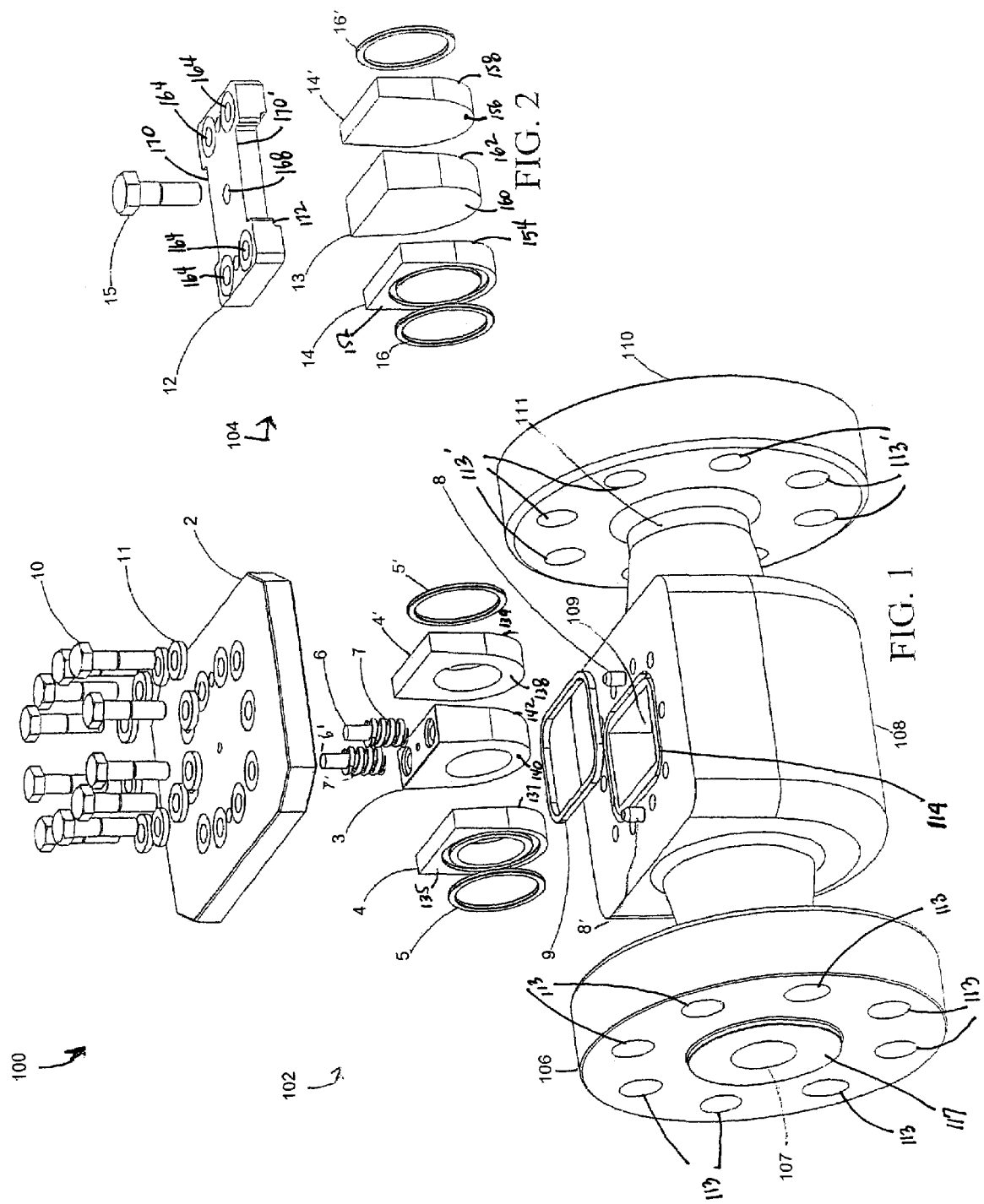

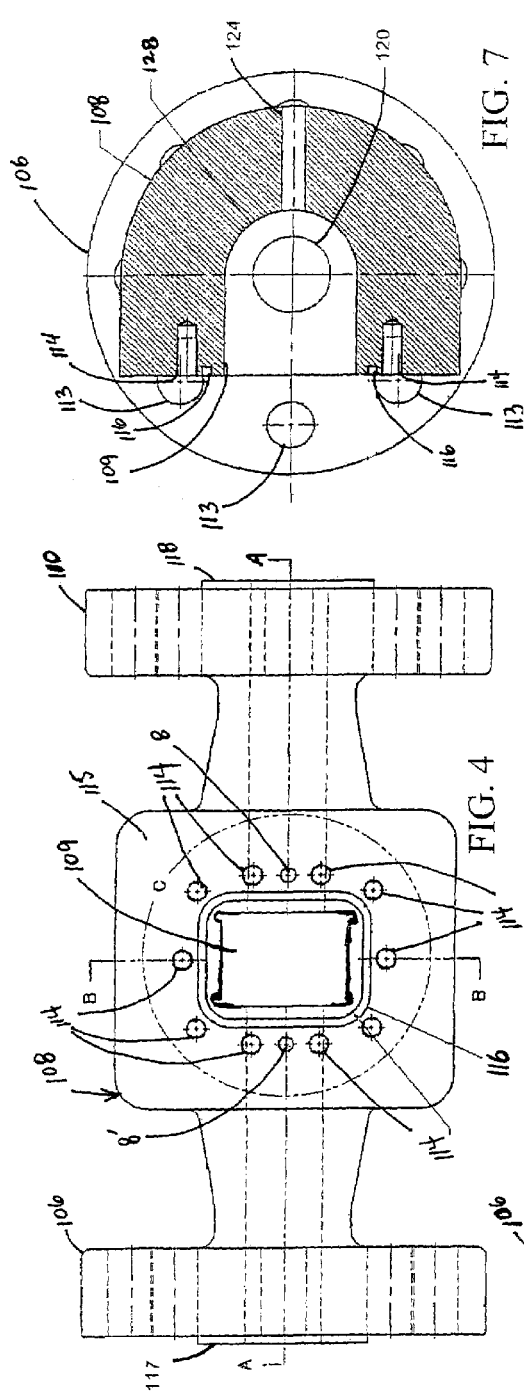
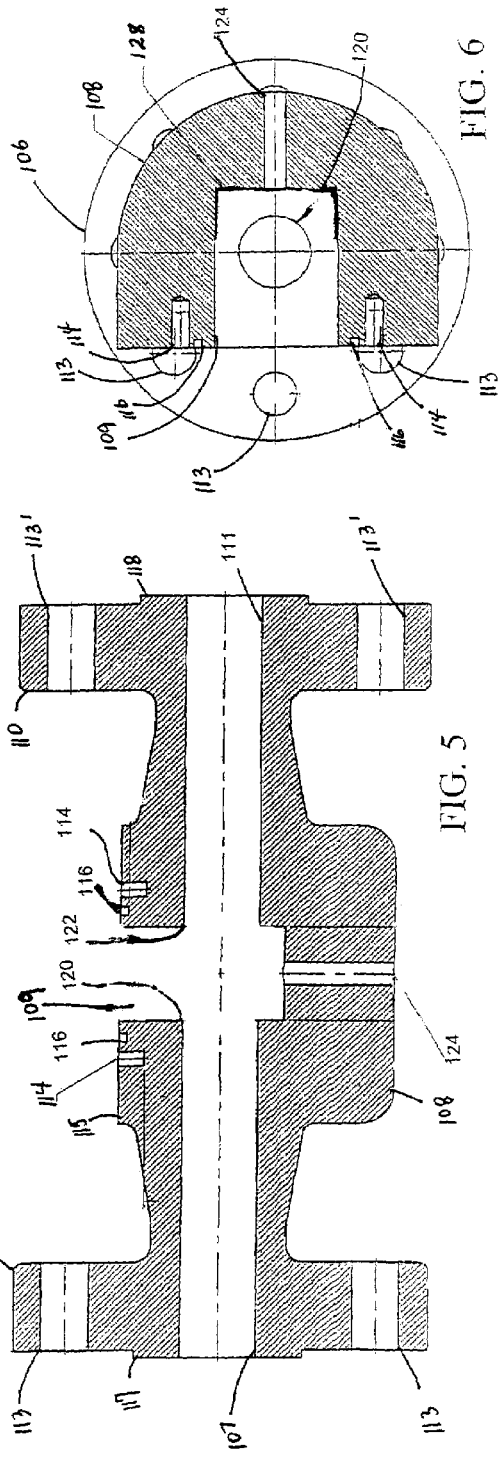

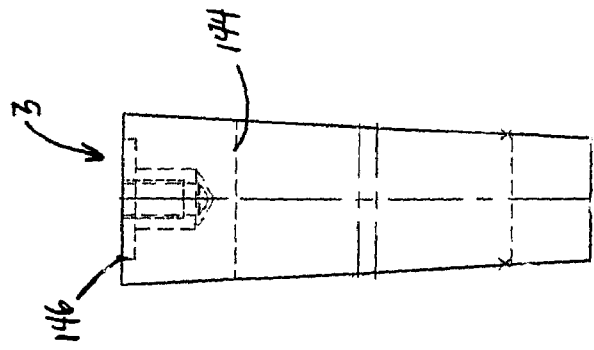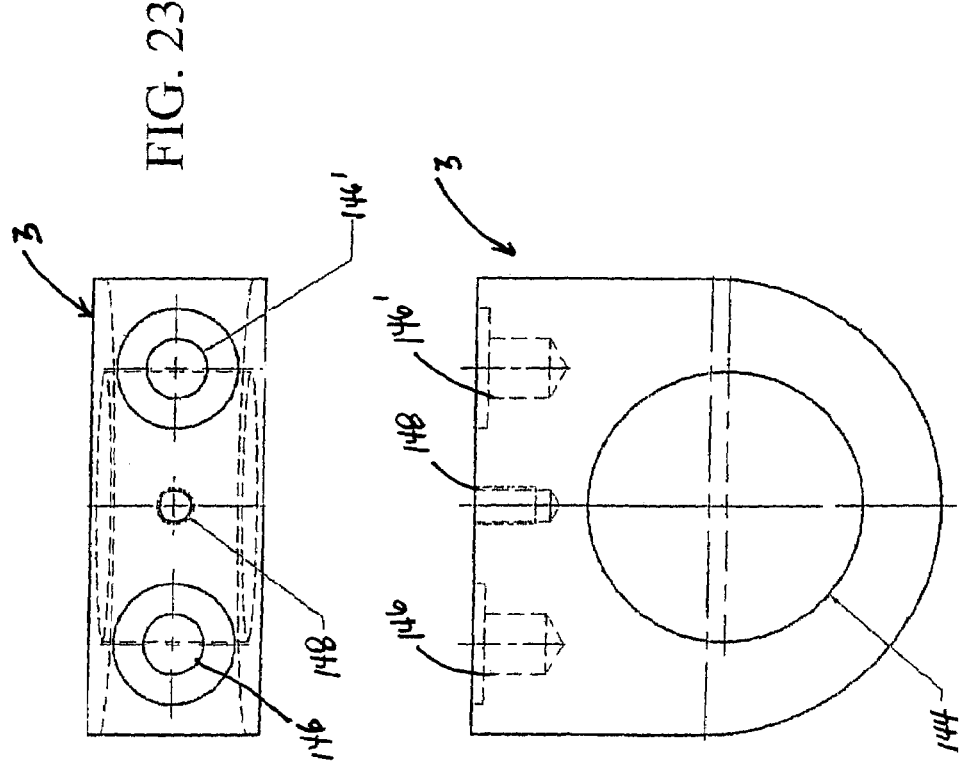

THREE-WEDGE DOUBLE BLOCK ISOLATION CHAMBER

CROSS-REFERENCE TO RELATED APPLICATION

This application claims the benefit of U.S. Provisional application Ser. No. 60/559,177, filed on Apr. 2, 2004.

BACKGROUND OF THE INVENTION

1. Field of the Invention

The present invention relates generally to devices which are placed in a pipeline, in-line, to stop the flow of fluid through the pipeline.

2. Description of the Related Art

In the process of removing oil or other related products from a source well, particularly in cold (adverse) environments such as Alaska, USA, it is known to inject materials under high pressure into the well in order to assist in the product removal effort. It is further known to inject differing materials in alternating fashion. Often these differing materials are incompatible, particularly in such adverse temperature environments. These materials are commonly delivered to the well through separate pipelines which come together at the well. In order to alternately provide such incompatible materials to the well as required, it is necessary to halt the flow of one material so as to allow the flow of the other, or vice versa. A need, therefore, exists for a device which prevents the flow of a material through a pipeline which can in the alternative allow such flow as required. It is a particular need for such a device for use in high pressure applications and/or in adverse environments.

Valves of many different configurations, such as gate valves or pin valves or the like have been commonly used in an effort to satisfy the above-described requirement. However, known valves include some type of mechanism which closes, or seats, to prevent flow which can be moved, or positioned, to alternately allow flow. Such repeated positioning between the valve and the seat causes wear over time. Eventually such valves begin to leak, particularly in high pressure, adverse conditions which could cause a serious problem in the above-described environment. A need, therefore, exists for a device which may alternately restrict flow and allow flow without causing wear to the sealing mechanism.

An additional limitation of valves commonly available is that they include a valve seat such that when, and if a leak occurs, the valve will allow fluid to enter the pipeline. In an effort to prevent this problem, it is common to install multiple of such valves employed in series. However, if one leaks, it vents fluid to the next valve in the pipeline. Over time, if the next valve begins to leak, fluid again enters the pipeline. A need exists for a device which includes multiple sealing surfaces wherein if one were to leak, fluid would not vent to the next sealing surface or the pipeline.

SUMMARY OF THE INVENTION

The present invention comprises a double block isolation chamber suited for use where it is necessary to be able to block a pipeline in an effort to prevent flow of its contents. Particularly, the isolation chamber of the present invention provides a separate seal block wedge positioned at both the inlet and the outlet of the chamber, herein referred to as "double block". The present invention is particularly suitable for situations where it is desired to be able to alternately block the flow-through the pipeline, allow fluid to flow-through the pipeline, and/or meter the flow of fluid through the pipeline.

The present invention is suited for use in high pressure (between approx. 2500 and 6500 psig) pipelines (i.e., 2 in. or 3 in. schedule 160 pipeline) in adverse environments. Such adverse environments include extremely cold operating conditions such as less than 0° and commonly −50° F., or even colder. The contents of the pipeline could be any fluid, including, but not limited to, water (salt water), natural gas (or the like), or petroleum (or the like).

The three-wedge double block isolation chamber of the present invention includes a body with an internal chamber bounded by an inlet at a first end, an outlet at a second end, and a wedge assembly positioned in the chamber. The wedge assembly may be either a blind wedge assembly, flow-through wedge assembly or a meter wedge assembly. The wedge assembly includes, in its basic embodiment, three elements: an upstream wedge, a downstream wedge, and a force wedge. Since there is no movement between the wedges, the seals will not wear over time.

The wedges seat into the internal chamber of the body such that the force wedge is positioned between the upstream wedge and the downstream wedge so as to create a seal between the upstream wedge and the inlet and the downstream wedge and the outlet. The force wedge includes an upstream surface and a downstream surface. Either or both of the upstream surface and/or the downstream surface of the force wedge may include a taper thereon.

The upstream surface of the upstream wedge is substantially flat and is pressed against the inlet of the body. The upstream surface of the upstream wedge includes a seal to create an interface (seal) between the upstream surface and the inlet. The downstream surface of the upstream wedge may include a taper thereon which mates an opposing taper on the upstream face of the force wedge.

The downstream surface of the downstream wedge is substantially flat and pressed against the outlet of the body. The downstream surface of the downstream wedge includes a seal to create a seal between the downstream surface and the outlet. The upstream surface of the downstream wedge may include a taper thereon which mates an opposing taper on the downstream face on the force wedge.

The tapered interface surfaces between the upstream wedge, downstream wedge, and force wedge act to force the upstream wedge and the downstream wedge against the inlet and outlet respectively. A substantial outward force is achieved to produce a seal at both the inlet end of the chamber and the outlet end of the chamber. The force wedge is retained in position by a force rod positioned against a top cover. The top cover is bolted to the body to securely hold the wedge assembly in place.

The wedge assembly of the present invention includes an interchangeable blind assembly, a flow-through assembly, and/or a meter wedge assembly. The blind assembly blocks the flow of liquid through the chamber and includes an upstream blind wedge, a downstream blind wedge, and a force blind wedge. The seals created at the inlet and the outlet create a double blind isolation chamber between the inlet and the outlet.

The flow of liquid through the isolation chamber is blocked when the blind assembly is secured into the body. Flow is resumed when the line is depressurized and the blind assembly replaced with a flow-through wedge assembly. The blind wedge assembly is removed by removing the top cover. The flow-through wedge assembly is then inserted which includes flow-through wedges that each include a central hole which is substantially the same diameter as the I.D. of the pipeline.

Features of the present invention include a three-wedge assembly positioned in a chamber, the design and shape of the three-wedge assembly and particularly the fact that the assembly creates a seal (double block) at both the inlet and the outlet of the isolation chamber in order to substantially prevent pipeline fluids from passing from the inlet through the outlet or vice-versa when the blind wedge assembly is installed in the body. Therefore, an isolation chamber which double blocks and seals is described. In the event that either the inlet seal or the outlet seal were to leak, pipeline fluid would enter the isolation chamber, however, the other, second seal would assist to prevent the fluid from entering the pipeline. The fluid would then be retained either within the isolation chamber or, depending upon the volume, leak outside the body to the surrounding atmosphere rather than into the pipeline.

It is, therefore, an object of the present invention to provide an isolation chamber for use in a pipeline which is capable of sealing the flow of liquid past the isolation chamber. It is another object of the present invention to provide such an isolation chamber which provides a seal at both the inlet and the outlet of the isolation chamber (double block).

Another object of the present invention is to provide a double block blind isolation chamber for use in high pressure adverse environments.

An additional object of the present invention is to provide a double block isolation chamber which is designed to leak to atmosphere rather than into the pipeline.

It is an additional object of the present invention to provide such a double block isolation chamber which is simple in design and easy to operate and maintain.

It is a further object of the present invention to provide such a double block isolation chamber including a wedge assembly which is easily accessible for removal/replacement.

It is yet a further object of the present invention to provide such a double block isolation chamber which includes a blind wedge assembly having an upstream wedge, a downstream wedge, and a force wedge, each having mated tapered surfaces.

It is still an additional object of the present invention to provide such a double block isolation chamber wherein the blind wedge assembly can be easily replaced with a flow-through wedge assembly having an upstream flow-through wedge, a downstream flow-through wedge, and a force flow-through wedge.

Thus, the present invention is well adapted to carry out the objects and attain the ends and advantages mentioned above as well as those inherent therein. While certain objects have been described, it is understood that additional objects and features may exist and become apparent from the specification, the claims, and/or the figures.

BRIEF DESCRIPTION OF THE DRAWINGS

FIG. 1 is an exploded view of the three-wedge double block isolation chamber of the present invention depicting the flow-through wedge assembly.

FIG. 2 is the blind wedge assembly of the three-wedge double block isolation chamber of the present invention.

FIG. 4 is a top view of the three-wedge double block isolation chamber of the present invention with the wedge assembly removed.

FIG. 5 is view taken along line A-A of the FIG. 4.

FIG. 6 is view taken along line B-B of FIG. 4.

FIG. 7 is an alternate embodiment view taken along line B-B of FIG. 4.

FIG. 21 is a front view of the flow-through force wedge of the flow-through wedge assembly.

FIG. 22 is a side view of the flow-through force wedge of FIG. 21.

FIG. 23 is a top view of the flow-through force wedge of FIG. 21.

DETAILED DESCRIPTION OF THE PREFERRED EMBODIMENTS

Figure 8:
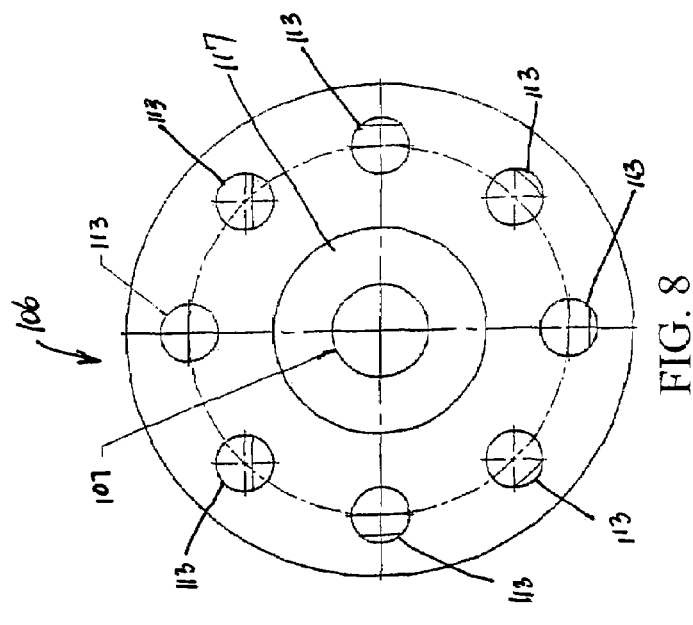
FIG. 8 is an end view of the inlet flange of the three-wedge double block isolation chamber of the present invention.

Before explaining the present invention in detail, it is important to understand that the invention is not limited in its application to the details of the apparatus illustrated and described herein. The invention is capable of other embodiments and of being practiced or carried out in a variety of ways. It is to be understood that the phraseology and terminology that is employed herein is the for the purpose of description and not of limitation.

Referring now to the drawings wherein like reference numerals indicate the same parts or steps throughout the several views. FIG. 1 shows an exploded view of the three-wedge double block isolation chamber 100 of the present invention. FIG. 1 depicts the isolation chamber 100 with flow-through wedge assembly 102 therein. FIG. 2 depicts an alternate blind wedge assembly 104.

The three-wedge double block isolation chamber 100 includes a body 108 with chamber 109 therein. Chamber 109 is sized and configured to receive a wedge assembly such as flow-through wedge assembly 102 or blind wedge assembly 104 as required. A cover such as cover 2 (or cover 12) can be secured to body 108 to retain wedge assembly 102 (or 104) within chamber 109.

An inlet flange 106 and an outlet flange 110 are secured to body 108 to allow three-wedge double block isolation chamber 100 to be installed in a pipeline. Inlet flange 106 and outlet flange 110 are bolted to opposing pipeline flanges through bolt holes 113 and 113' respectively. Inlet flange 106 and outlet flange 110 retain the pipeline in substantial alignment even when the wedge assemblies are removed from body 108. Inlet flange 106 includes an inlet orifice 107 to allow fluid to enter body 108 so that the pipeline is in fluid communication with chamber 109.

Figure 3:
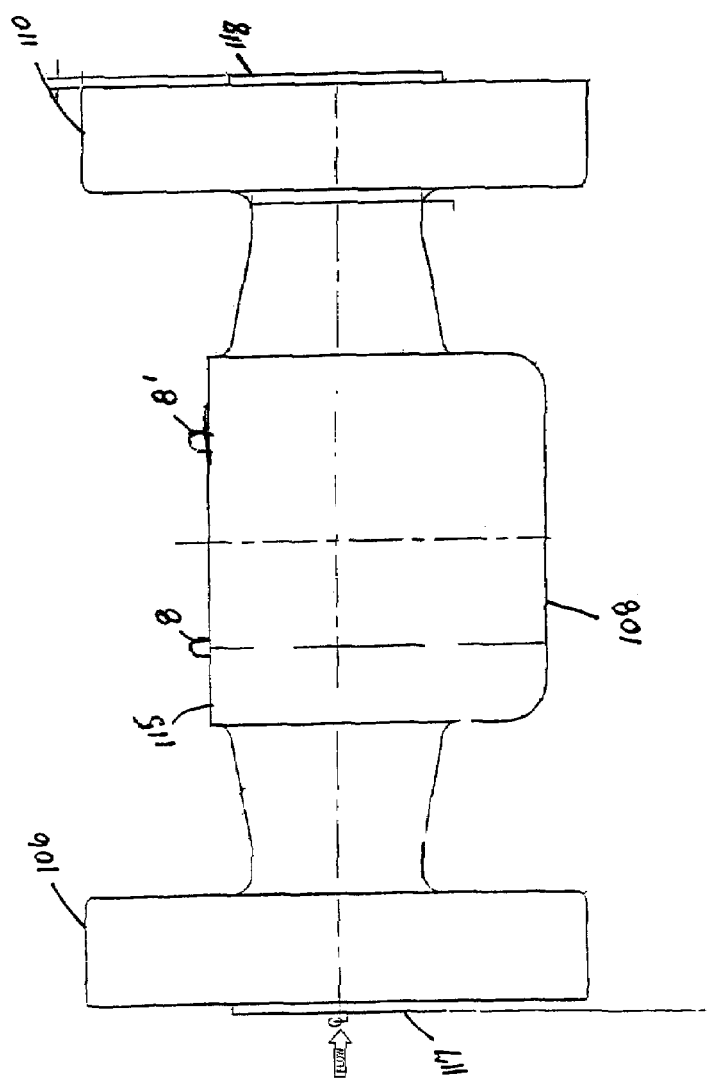
FIG. 3 is the body of the three-wedge double block isolation chamber of the present invention.

FIG. 3 depicts body 108 from a side view to which inlet flange 106 and outlet flange 110 are secured. FIG. 4 depicts body 108 from a top view with cover 2 and flow-through wedge assembly 102 removed. The top surface 115 of body 108 is substantially flat to receive top cover 2 (or 12). A plurality of holes, collectively 114, are drilled and tapped into top surface 115 of body 108 in order to receive a plurality of bolts, collectively 10 (FIG. 1), for the purpose of securing cover 2 onto top surface 115 of body 108. With cover 2 (or 12) removed, chamber 109 is open and extends into body 108. A groove 116 may be cut into top surface 115 of body 108 for the purpose of receiving a seal 9 (FIG. 1) which substantially encircles chamber 109.

Referring next to FIG. 5, a cutaway view of body 108 with inlet flange 106 and outlet flange 110 secured thereon. In the preferred embodiment, inlet flange 106 and outlet flange 110 are molded integrally with body 108. As shown in FIG. 5, inlet orifice 107 of inlet flange 106 extends into chamber 109 through inlet 120 such that chamber 109 is in fluid communication with the pipeline to which inlet flange 106 is attached. Also, as shown, outlet orifice 111 extends from an outlet 122 in chamber 109 through body 108 and outlet flange 110. In this way, chamber 109 is in fluid communication with the pipeline to which outlet flange 110 is secured. A drain 124 may be drilled through body 108 into chamber 109 to allow any fluid which may be present in chamber 109 to be released to atmosphere. Drain 124 may be fitted with a valve or a pressure release valve as required to seal chamber 109 during flow-through or metering operation. When blind wedge assembly 104 is installed in chamber 109, drain 124 may be opened so as to provide an escape for any fluid which may leak into chamber 109.

FIG. 6 is a cross-sectional view depicting chamber 109 of body 108. In the preferred embodiment, chamber 109 includes a squared-bottom surface 126. FIG. 7 depicts an alternate embodiment where chamber 109 includes a radius-bottom surface 128. The bottom surface of chamber 109 may be squared as in the preferred embodiment of FIG. 6 for ease of manufacture or may alternately be radiused as in 128 of FIG. 7 so as to match the radius of the wedge assembly inserted therein.

FIG. 8 depicts inlet flange 106 from an end view, including bolt holes 113, inlet orifice 107, and inlet face 117. Inlet face 117 provides a sealing surface with a pipeline flange bolted thereto. Outlet flange 110 includes an outlet orifice 111 to allow fluid to exit body 108 so that chamber 109 is in fluid communication with the pipeline. An outlet face 118 provides a sealing surface with an outlet pipeline flange bolted thereto. Thus, the three-wedge double block isolation chamber may be instilled in-line on a pipeline.

Referring back to FIG. 1, wedge assembly 102 is inserted into chamber 109 of body 108. In the embodiment of FIG. 1, isolation chamber 100 is depicted with a flow-through wedge assembly 102 positioned therein. In its preferred embodiment, flow-through wedge assembly 102 can be configured in a 2" or 3" configuration matching the size of the pipeline into which isolation chamber 100 is installed. However, wedge assembly 102 can be configured to fit any pipeline I.D. as other suitable configurations are contemplated without departing from the spirit and scope of the invention.

Flow-through wedge assembly 102 includes, generally, a flow-through force wedge 3 positioned between a pair of flow-through wedges 4 and 4', a pair of spring seals 5 and 5', and a cover 2 capable of being secured onto the top 115 of body 108 by a plurality of screws, collectively 10 and washers 11. Ten such screws 10 and washers 11 are depicted in FIG. 1 for the purpose of exemplification.

Figure 18:
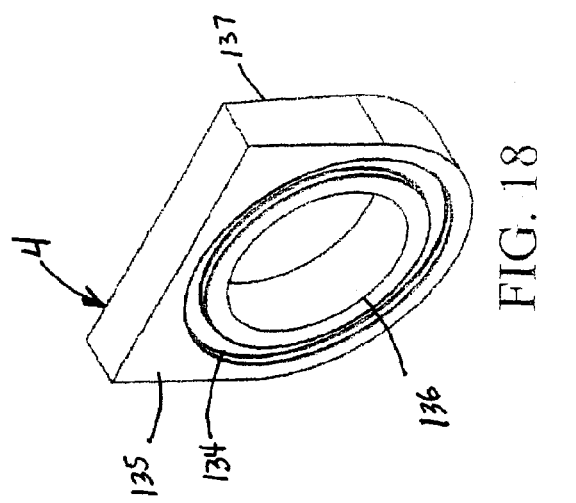
FIG. 18 is an isometric view of the flow-through wedge of the flow-through wedge assembly.
Figure 20:
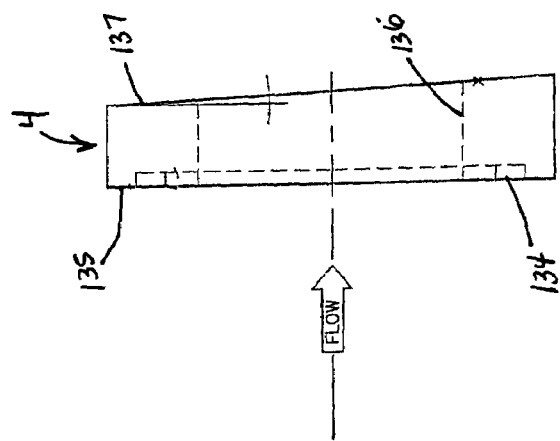
FIG. 20 is a side view of the flow-through wedge of FIG. 18.
Figure 19:
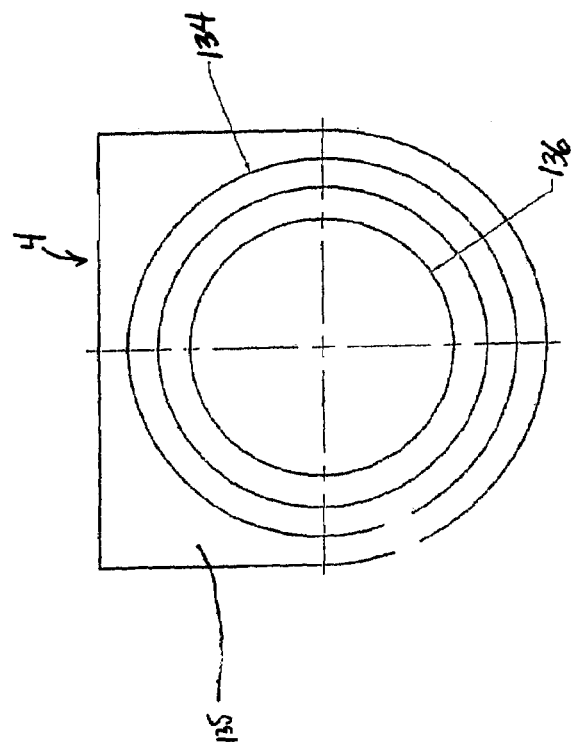
FIG. 19 is a front view of the flow-through wedge of FIG. 18.

Referencing FIG. 1 in combination with FIGS. 18, 19, and 20, an upstream wedge 4 includes a seal 5 installed in channel 134 or upstream surface 135 is inserted into chamber 109 adjacent inlet 120 concentric with inlet orifice 107. Upstream wedge 4 includes a central orifice 136 of a diameter substantially equal to the diameter of inlet orifice 107 (and the I.D. of the pipeline).

Downstream wedge 4' is substantially identical to upstream wedge 4 but is inserted into chamber 109 such that seal 5' positioned on downstream surface 139 is adjacent outlet 122. Downstream wedge 4' including a downstream seal 5' is positioned in chamber 109 adjacent outlet flange 110 concentric with outlet orifice 111 within outlet flange 110. Both upstream wedge 4 and downstream wedge 4' include a taper on their interior surfaces which mate the taper of flow-through force wedge 3 which is inserted between upstream wedge 4 and downstream wedge 4'. Specially, downstream surface of wedge 4 includes a taper which mates the taper on upstream surface 140 of flow-through force wedge 3 and upstream surface of wedge 4' includes a taper which mates the taper on downstream surface 142 of flow-through force wedge 3. Flow-through force wedge 3 is depicted in FIGS. 21-23. In the preferred embodiment, a taper of 3° has been deemed particularly suitable, however, other tapers are contemplated. An orifice 144 in flow-through force wedge 3 is preferably concentric with those in upstream wedge 4 and downstream wedge 4' to allow an unimpeded flow of liquid from inlet passage 107 past inlet 120 through chamber 109 past outlet 122 and out through outlet passage 111.

Flow-through force wedge 3 includes holes 146 and 146' to receive dowel pins 6 and 6' (and dowel springs 7 and 7') respectively. Force wedge 3 may also include a hole 148 drilled and tapped therein to receive a bolt extending through cover 2.

Flow-through force wedge 3 includes a taper which mates the taper of upstream wedge 4 on its downstream face 137 and downstream wedge 4' on its upstream face 138 such that when flow-through force wedge 3 is pressed firmly in chamber 109 between upstream flow-through wedge 4 and downstream flow-through 4' a seal is obtained between seal 5 and inlet 120 inside chamber 109 and seal 5' in outlet 122 inside chamber 109.

A pair of dowel pins 6 and 6' which each include a dowel spring 7 and 7' surrounding dowel pins 6 and 6' respectively are positioned in holes 146 and 146' in flow-through force wedge 3 between flow-through force wedge 3 and cover 2 when flow-through valve 102 is inserted into chamber 109. Dowel pins 6 and 6' force and retain flow-through force wedge 3 between upstream 4 and downstream wedge 4' such that the holes in upstream wedge 4, flow-through force wedge 3, and downstream wedge 4' remain concentric. The upper surface of body 108 may include locator pins 8 and 8' thereon for accurately locating cover 2 onto body 108.

Figure 25:
FIG. 25 is a view of the cover seal of the FIG. 24 taken along line A-A.
Figure 24:
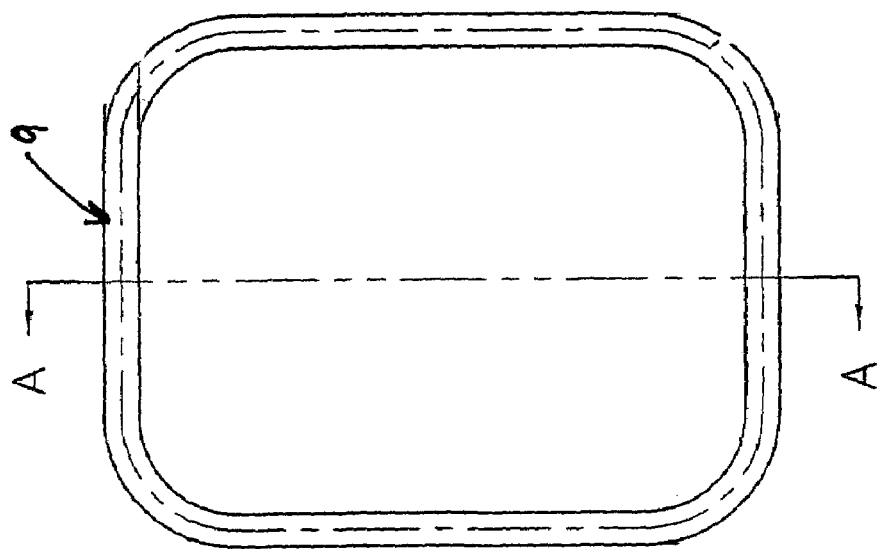
FIG. 24 is a top view of the cover seal.

A seal 9 may be positioned between cover 2 and body 108. Seal 9 is shown in detail in FIGS. 23 and 25 and is preferably constructed of an elastomeric material and available commercially. Seal 9 is positioned in channel 114 (FIGS. 1, 4, and 5).

Figure 17:
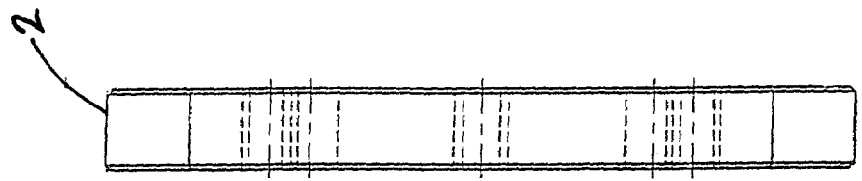
FIG. 17 is a side view of the cover of FIG. 16.
Figure 16:
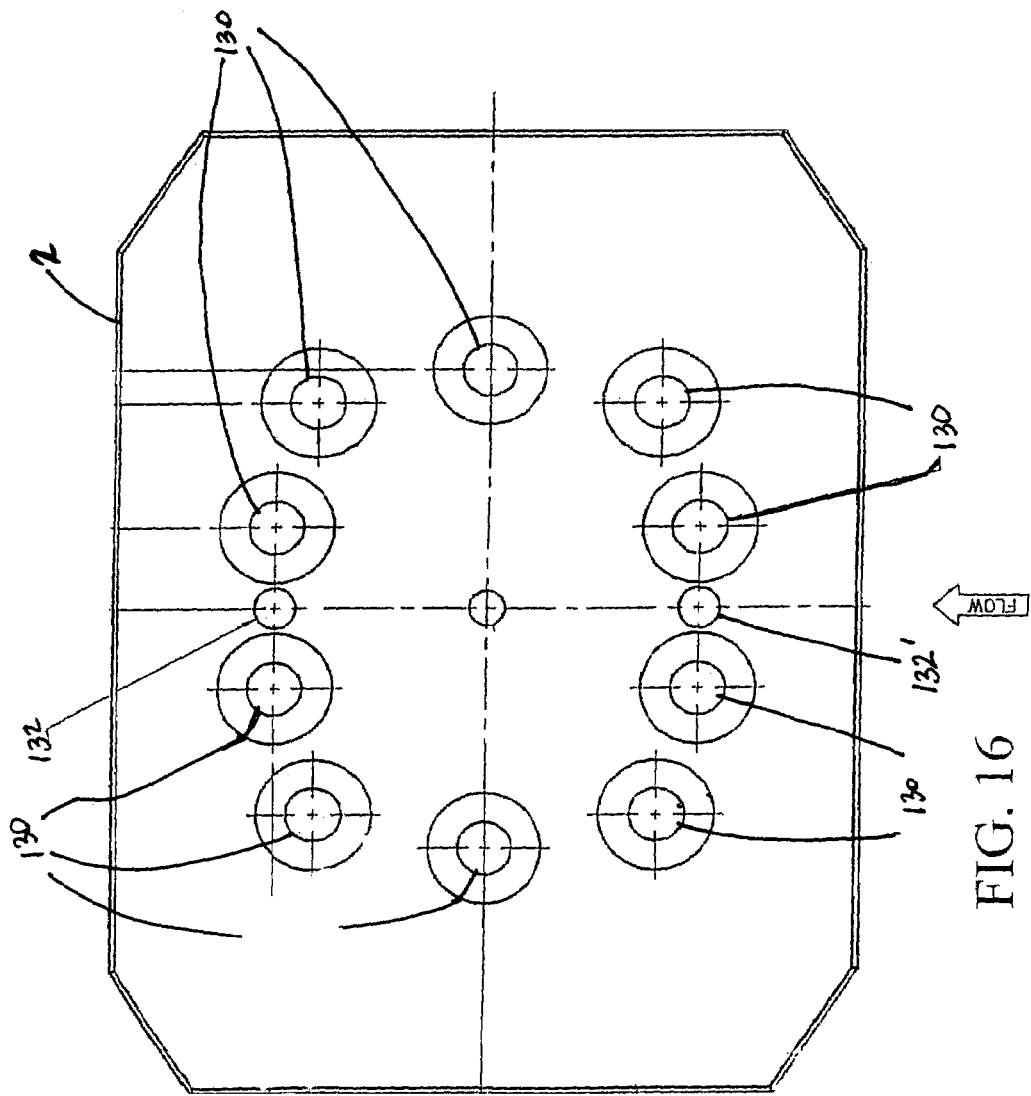
FIG. 16 is a top view of the cover for the body of the flow-through wedge assembly.

FIGS. 16 and 17 depict cover 2 which retains flow-through wedge assembly 102 within chamber 109. Cover 2 includes a plurality of bolt holes, collectively 130, drilled therethrough to receive bolts 10 of FIG. 1. Cover 2 also includes holes 132 and 132' drilled partially therethrough to receive locator pins 8 and 8' respectively. Referring back to FIG. 1, bolts 10 and washers 11 are inserted to retain cover 2 onto body 108 so as to provide an upper surface which forces dowel pins 6 and 6' and thereby flow-through force wedge 3 into concentric arrangement with upstream flow-through wedge 4 and downstream flow-through wedge 4' as described above.

Three-wedge double block isolation chamber 100 of the present invention also includes a blind wedge assembly 104 (FIG. 2) which is interchangeable with flow-through valve assembly 102 (FIG. 1) when it is desirous to prevent the flow of fluid through the pipeline and specifically through isolation chamber 109. Blind wedge assembly 104 includes, generally, blind force wedge 13, upstream blind wedge 14, downstream blind wedge 14', compression bar 12 and force bolt 15. When interchanged with flow-through wedge 102, blind wedge 104 is inserted into chamber 109 of body 108 such that blind force wedge 13 is positioned between upstream block wedge 14 and downstream blind wedge 14'.

Figure 11:
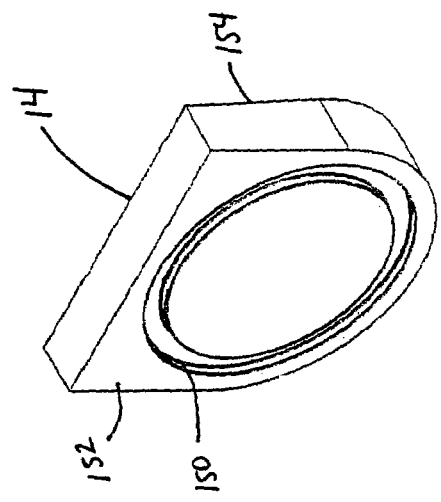
FIG. 11 is an isometric view of the blind wedge of the blind wedge assembly.
Figure 13:
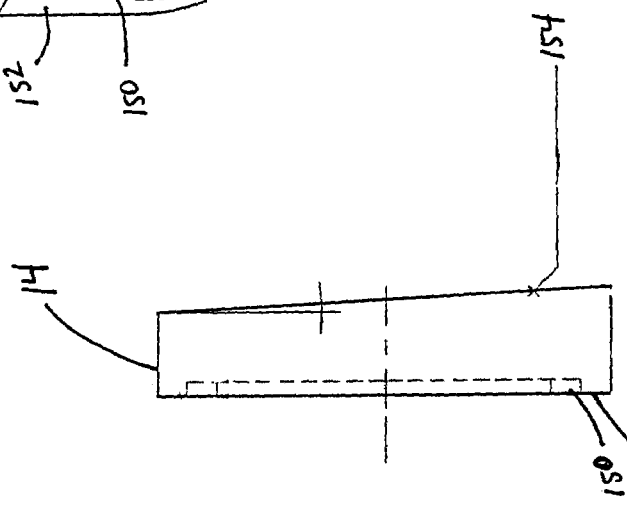
FIG. 13 is a side view of the blind wedge of FIG. 11.
Figure 12:
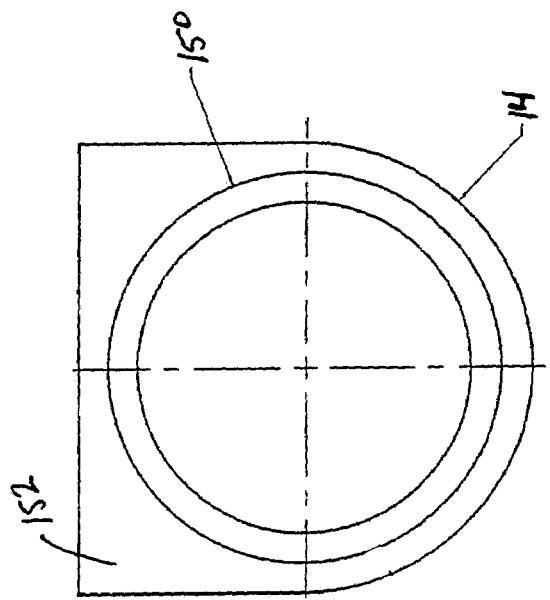
FIG. 12 is a front view of the blind wedge of the blind wedge assembly.
Figure 27:
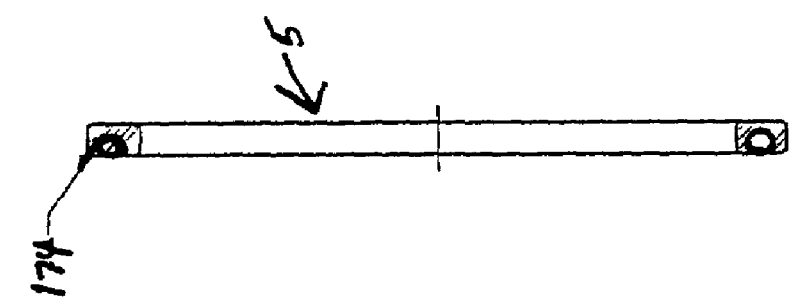
FIG. 27 is a view of the spring seal of FIG. 26 taken along line A-A.
Figure 26:
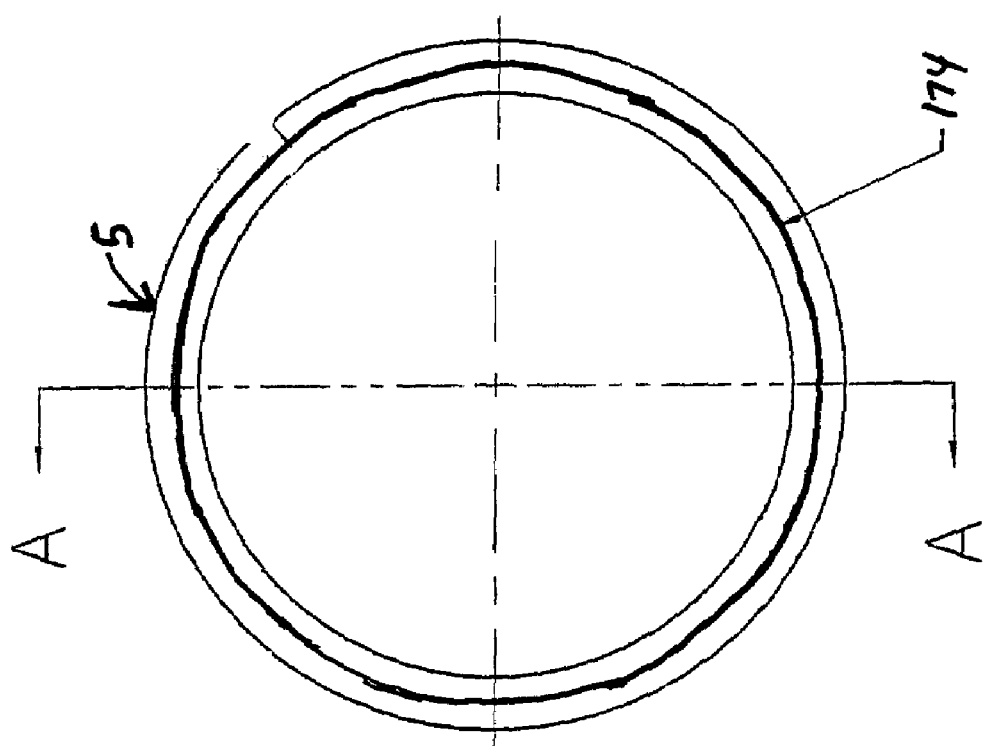
FIG. 26 is a top view of the spring seal.

Upstream blind wedge 14 is depicted in FIGS. 11-13 and includes a channel 150 to receive seal 16 (FIG. 2) therein. Seal 16 is the same type of seal as seal 5 depicted in FIGS. 26 and 27 and described above with regard to flow-through wedge assembly 102. Upstream block wedge is solid to prevent the flow of fluid. Upstream blind wedge 14 is positioned in chamber 109 such that upstream surface 152 including seal 16 is adjacent inlet 120 such that upstream blind wedge 14 blocks the flow of liquid from entering chamber 109 through inlet 120. Likewise, downstream blind wedge 14' is positioned in chamber 109 adjacent outlet 122 and includes a seal 16' so as to block the flow of liquid to/from outlet 122. Downstream blind wedge 14' is substantially identical to upstream wedge 14 but is inserted into chamber 109 such that seal 16' is positioned against outlet 122.

Figure 15:
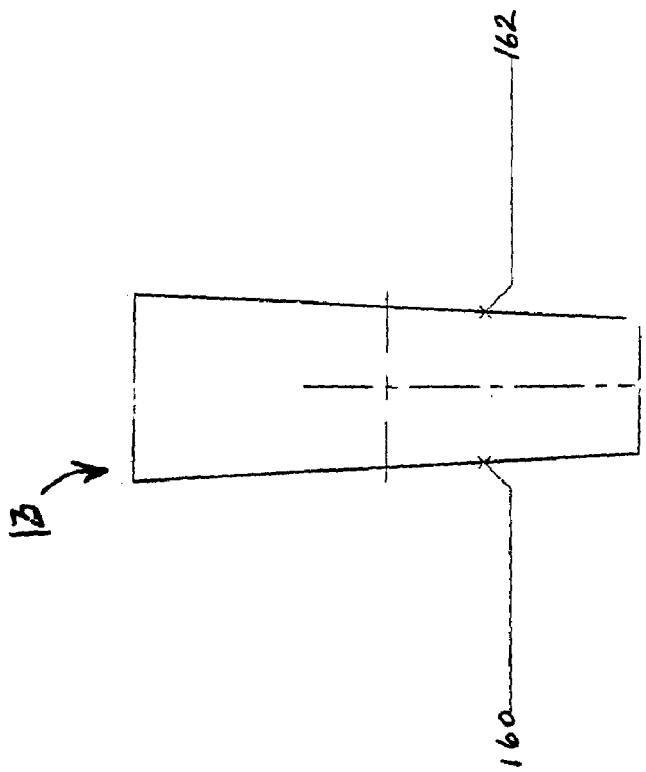
FIG. 15 is a side view of the blind force wedge of FIG. 14.
Figure 14:
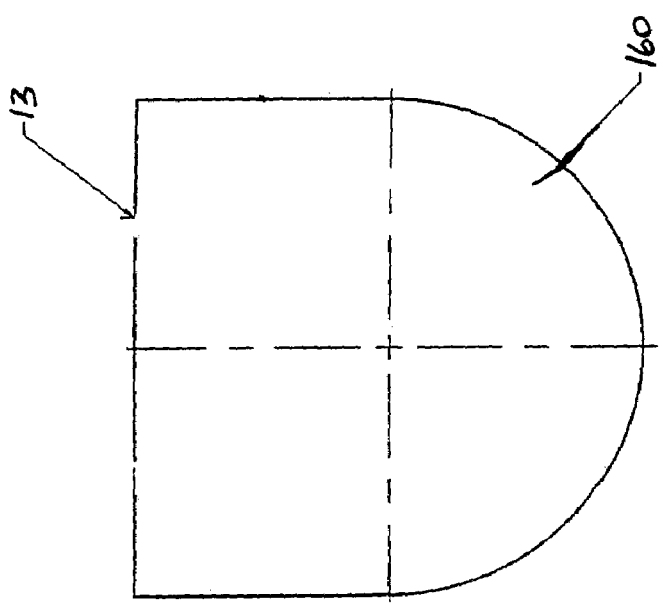
FIG. 14 is a front view of the blind force wedge of the blind wedge assembly.

Blind force wedge 13 is shown in FIGS. 14 and 15. Blind force wedge 13 is positioned between upstream blind wedge 14 and downstream blind wedge 14' and provides pressure to upstream blind wedge 14 and downstream blind wedge 14' to retain a tight seal between inlet 120 and outlet 122, respectively, thereby effectively blocking the flow of liquid through isolation chamber 100.

Both upstream blind wedge 14 and downstream blind wedge 14' include a tapered surface which mates a taper on the faces of blind force wedge 13. Specifically, downstream surface of block wedge 14 includes a taper which mates the taper on upstream surface 160 of blind force wedge 13, and upstream surface of wedge 14' includes a taper which mates the taper on downstream surface 162 of blind force wedge 13. A taper of 3° has been found particularly suitable for the preferred embodiment, however, other suitable tapers are contemplated.

Blind wedge assembly 104 is secured in chamber 109 by compression bar 12. Compression bar 12 is shown in greater detail in FIGS. 9 and 10. Compression bar 12 includes a plurality of holes 164 drilled therethrough to receive bolts and washers (such as bolts 10 and washers 11 of FIG. 1) which are screwed into holes 114 of body 108. Compression bar 12 also includes holes 166 and 166' to receive locator pins 8 and 8' of body 108. A central hole 168 is drilled and tapped in compression bar 12 to receive a force rod 15 (FIG. 2).

Figure 10:
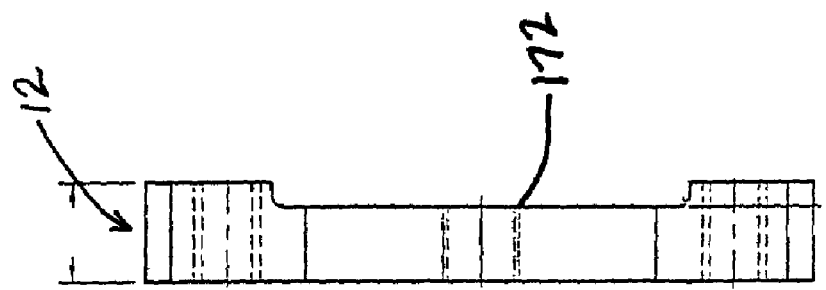
FIG. 10 is a side view of the compression bar of FIG. 9.
Figure 9:
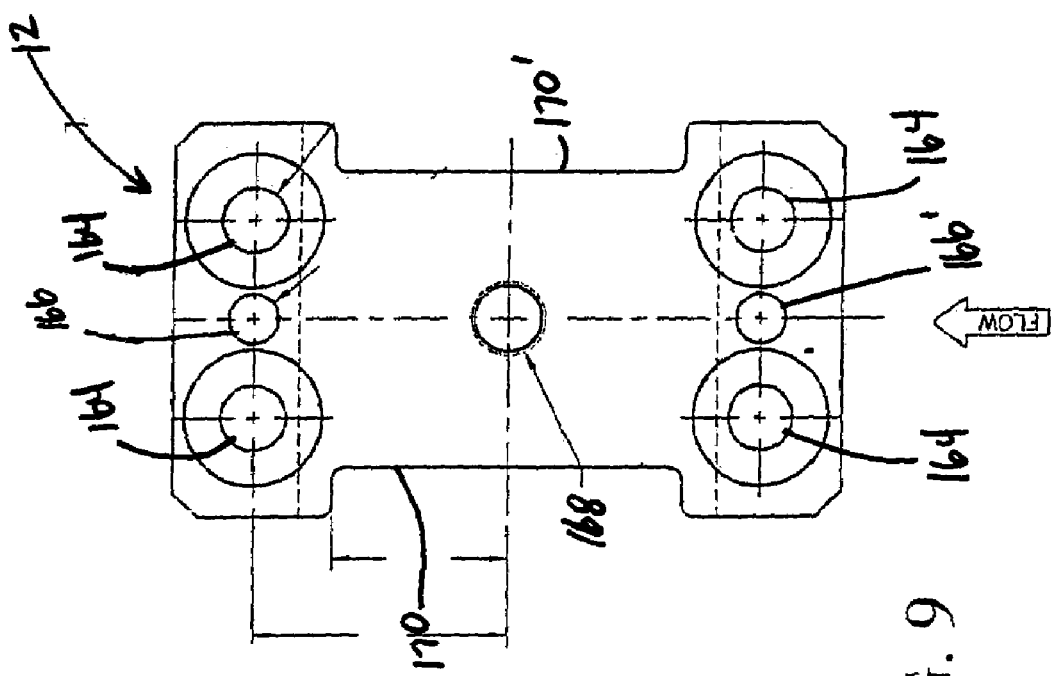
FIG. 9 is a top detail of the compression bar of the blind wedge assembly of the three-wedge double block isolation chamber of the present invention.

As can be seen in FIGS. 9 and 10, a cutout 170 and 170' on each side of compression bar 12. In addition, compression bar 12 includes an arched portion 172 therein. The purpose of cutouts 170 and 170' and arched portion 172 is so that compression bar 12 does not seal against body 108. Since chamber 109 is not sealed, in the event that upstream block wedge 14 or downstream bock wedge 14' were to leak, fluid would enter chamber 109 and exit around compression bar 12 into the atmosphere rather than through the other seal. As a result, fluid would not leak past the secured seal.

Upon assembly, blind wedge assembly 104 is inserted into chamber 109 of body 108 such that compression bar 12 is secured to the top of body 108 using bolts 10 and washers 11. Force rod 15 is threaded through compression bar 12 to force blind force wedge 13 between upstream blind wedge 14 and downstream blind wedge 14'. This, in turn, forces upstream surface 152 of upstream wedge 14 against inlet 120 of chamber 109 and downstream surface 150 of downstream wedge 14' against outlet 122 of chamber 109.

As an alternative, the flow-through wedge assembly of FIG. 1 may be replaced with a meter wedge assembly in chamber 109. The meter wedge assembly includes a flow-through wedge with a bore diameter that is smaller than the I.D. of the pipeline and inlet orifice 107. The bore diameter of the meter wedge assembly is known. Either the pipeline or isolation chamber 100 are fitted with instrumentation (known in the art) to measure the line pressure before the meter wedge assembly and after the meter wedge assembly in order to obtain the pressure drop. From this, known standards are consulted (such as API standards for differential pressure equations) in order to determine the liquid flow rate through isolation chamber 100.

While the invention has been described with a certain degree of particularity, it is manifest that many changes may be made in the details of construction without departing from the spirit and scope of this disclosure. It is understood that the invention is not limited to the embodiment set forth herein for purposes of exemplification, but is to be limited only by the scope of the attached claim or claims, including the full range of equivalency to which each element thereof is entitled.

What is claimed is:

1. A three-wedge isolation chamber, comprising:
   a body having a chamber therein;
   said chamber including an inlet and an outlet;
   a plurality of wedge assemblies each interchangeably positionable in said chamber;
   said plurality of wedge assemblies each including an upstream wedge, a downstream wedge, and a force wedge;
   said upstream wedge being positioned adjacent said inlet and said downstream wedge being positioned adjacent said outlet;
   said force wedge being positioned between said upstream wedge and said downstream wedge so as to create a seal between said upstream wedge and said inlet and said downstream wedge and said outlet;
   said plurality of wedge assemblies including at least one blind wedge assembly and at least one flow-through wedge assembly; wherein at least said upstream wedge and said force wedge of the at least one blind wedge assembly are blind.

2. The three-wedge isolation chamber of claim 1 wherein said force wedge includes an upstream surface and a downstream surface wherein at least one of said surfaces includes a taper thereon.

3. The three-wedge isolation chamber of claim 2 wherein both said upstream surface and said downstream surface include a taper thereon.

4. The three-wedge isolation chamber of claim 3 wherein said upstream wedge includes a downstream surface having a taper thereon positioned adjacent said upstream surface of said force wedge and said downstream wedge includes upstream surface having a taper thereon positioned adjacent said downstream surface of said force wedge.

5. The three-wedge isolation chamber of claim 2 wherein said upstream wedge includes a downstream surface having a taper thereon positioned adjacent said tapered surface of said force wedge.

6. The three-wedge isolation chamber of claim 2 wherein said downstream wedge includes a downstream surface having a taper thereon positioned adjacent said tapered surface of said force wedge.

7. The three-wedge isolation chamber of claim 1 wherein said upstream wedge includes a seal positioned between said upstream wedge and said inlet.

8. The three-wedge isolation chamber of claim 1 wherein said downstream wedge includes a seal positioned between said upstream wedge and said outlet.

9. The three-wedge isolation chamber of claim 1 wherein said flow-through wedge assembly includes a diameter which is less than said inlet and/or said outlet.

10. The thee-wedge isolation chamber of claim 9 wherein said flow-through wedge assembly includes a flow meter in communication therewith.

11. The three-wedge isolation chamber of claim 10 wherein said body includes a cover over said chamber.

12. The three-wedge isolation chamber of claim 11 wherein said cover does not seal said chamber whereby pipeline fluid in said chamber may vent past said cover.

13. The three-wedge isolation chamber of claim 1 wherein said body includes a top cover to seal said chamber.

14. A three-wedge isolation chamber, comprising:
a body having a chamber therein;
said chamber including an inlet and an outlet;
a removable blind wedge assembly positioned in said chamber;
said wedge assembly including an upstream blind wedge, a downstream blind wedge and a force blind wedge;
said upstream blind wedge including an upstream surface positioned adjacent said inlet and a downstream surface including a taper thereon;
said downstream blind wedge including a downstream surface positioned adjacent said outlet and an upstream surface including a taper thereon;
said force blind wedge including an upstream surface including a taper which mates the taper of said downstream surface of said upstream blind wedge and a downstream surface including a taper which mates the taper of said upstream surface of said upstream blind wedge;
said force blind wedge being positioned between said upstream blind wedge and said downstream blind wedge so as to create a seal between said upstream blind wedge and said inlet and said downstream blind wedge and said outlet.

15. The three-wedge isolation chamber of claim 14 wherein said upstream surface of said upstream wedge includes a seal positioned between said upstream wedge and said inlet and said downstream surface of said downstream wedge includes a seal positioned between said downstream wedge and said outlet.

16. The three-wedge isolation chamber of claim 14 wherein said taper is a 3° taper.

17. The three-wedge isolation chamber of claim 14 wherein said blind wedge assembly is interchangeable with a flow-through wedge assembly, comprising:
an upstream flow-through wedge, a downstream flow-through wedge and a force flow-through wedge;
said upstream flow-through wedge including an upstream surface positioned adjacent said inlet and a downstream surface including a taper thereon;
said downstream flow-through wedge including a downstream surface positioned adjacent said outlet and an upstream surface including a taper thereon;
said force flow-through wedge including an upstream surface including a taper which mates the taper of said downstream surface of said upstream flow-through wedge and a downstream surface including a taper which mates the taper of said upstream surface of said upstream flow-through wedge;
said force flow-through wedge being positioned between said upstream flow-through wedge and said downstream flow-through wedge so as to create a seal between said upstream flow-through wedge and said inlet and said downstream flow-through wedge and said outlet.

18. The three-wedge isolation chamber of claim 17 wherein said flow-through wedge assembly includes a flow meter in communication therewith.

19. The three-wedge isolation chamber of claim 14 wherein said wedge assembly includes a cover over said chamber wherein said cover does not seal said chamber to allow fluid in said chamber to vent past said cover.

20. A three-wedge isolation chamber for installation in-line in a pipeline, comprising:
a body having a chamber therein;
said chamber including an inlet and an outlet;
an inlet flange extending from said body;
said inlet flange including an inlet orifice;
said chamber being in fluid communication with said pipeline through said inlet and said inlet orifice;
an outlet flange extending from said body;
said outlet flange including an outlet orifice;
said chamber being in fluid communication with said pipeline through said outlet and said outlet orifice;
a plurality of wedge assemblies each interchangeably positional in said chamber;
said plurality of wedge assemblies each including an upstream wedge, a downstream wedge, and a force wedge;
said upstream wedge including an upstream surface positioned adjacent said inlet and a downstream surface including a taper thereon;
said downstream wedge including a downstream surface positioned adjacent said outlet and an upstream surface including a taper thereon;
said force wedge including an upstream surface including a taper which mates the taper of said downstream surface of said upstream wedge and a downstream surface including a taper which mates the taper of said upstream surface of said upstream wedge;
said force wedge being positioned between said upstream wedge and said downstream wedge so as to create a seal between said upstream wedge and said inlet and said downstream wedge and said outlet;

said plurality of wedge assemblies including at least one blind wedge assembly and at least one flow-through wedge assembly; wherein at least said upstream wedge and said force wedge of the at least one blind wedge assembly are blind.

21. The three-wedge isolation chamber of claim 20 wherein said upstream surface of said upstream wedge includes a seal positioned between said upstream wedge and said inlet and said downstream surface of said downstream wedge includes a seal positioned between said downstream wedge and said outlet.

* * * * *